United States Patent [19]

Ohnishi et al.

[11] Patent Number: 5,444,130
[45] Date of Patent: Aug. 22, 1995

[54] PROCESS FOR PRODUCING VINYL CHLORIDE-BASED POLYMER

[75] Inventors: Shuji Ohnishi, Lake Jackson, Tex.; Tadashi Amano, Ibaraki, Japan

[73] Assignee: Shin-Etsu Chemical Co., Ltd., Tokyo, Japan

[21] Appl. No.: 63,605

[22] Filed: May 19, 1993

[30] Foreign Application Priority Data

May 19, 1992 [JP] Japan ................... 4-151503

[51] Int. Cl.$^6$ .............................. C08F 14/06
[52] U.S. Cl. ...................... 526/67; 526/74; 526/344.2
[58] Field of Search ............ 526/344.2, 62, 67, 74

[56] References Cited

U.S. PATENT DOCUMENTS

| | | | |
|---|---|---|---|
| 3,738,974 | 6/1973 | Takehisa et al. | 526/62 |
| 3,825,512 | 7/1974 | Reiter et al. | 526/62 |
| 4,247,686 | 1/1981 | Takemoto et al. | 526/344.2 |

*Primary Examiner*—Joseph L. Schofer
*Assistant Examiner*—Tom Weber
*Attorney, Agent, or Firm*—Oblon, Spivak, McClelland, Maier, & Neustadt

[57] ABSTRACT

An apparatus for producing a vinyl chloride-based polymer which comprises a polymerization vessel for carrying out suspension polymerization of a monomeric material containing at least vinyl chloride dispersed in an aqueous suspension, and a circulating passage extended from said polymerization vessel and through a heat exchanger back to said polymerization vessel for circulating a polymerization reaction mixture, wherein the polymerization reaction mixture returning from said circulating passage into said polymerization vessel is sprayed inside the polymerization vessel so that the inside wall portion of said polymerization vessel in a gas-phase zone is entirely wetted with the polymerization reaction mixture. Because the inside wall of the polymerization vessel in an area ranging from a gas-phase zone to a gas-liquid interface portion is constantly kept wetted with the polymerization reaction mixture (aqueous suspension) returning into the polymerization vessel, the problems of stagnation of the polymerization reaction mixture on the inside wall and deposition of polymer slurry on the inside wall can be obviated effectively. As a result, polymer scale deposition on the inside wall of the polymerization vessel in the area ranging from the gas-phase zone to the gas-liquid interface portion can be effectively prevented.

2 Claims, 2 Drawing Sheets

PROCESS FOR PRODUCING VINYL CHLORIDE-BASED POLYMER

BACKGROUND OF THE INVENTION

1. Field of the Invention

The present invention relates to an apparatus and process for producing a vinyl chloride homopolymer or vinyl chloride-based copolymer (hereinafter generically referred to as "vinyl chloride-based polymer"), and more particularly to an apparatus and process for producing a vinyl chloride-based polymer wherein polymerization of vinyl chloride monomer or a vinyl chloride-based monomeric mixture (hereinafter generically referred to as "vinyl chloride-based monomeric material") dispersed in an aqueous suspension for polymerization reaction is carried out while circulating the aqueous suspension through a heat exchanger which is arranged separately from a polymerization vessel.

2. Description of the Prior Art

Heretofore, suspension polymerization of a vinyl chloride-based monomeric material has been carried out by a process in which water, the vinyl chloride-based monomeric material, a polymerization initiator and a dispersant, together with other various additives as required, are placed into a polymerization vessel equipped with a jacket and a reflux condenser, and cooling water is passed through the jacket and reflux condenser to remove the heat of polymerization, thereby controlling the temperature of the reaction system to a predetermined temperature.

With the trend toward use of larger polymerization vessels in recent years, however, the heat transfer surface area of the polymerization vessel per unit quantity of polymerization reaction mixture has been decreased. Therefore, it has become difficult to achieve effective removal of heat by conventional cooling means. To cope with this problem, various methods have been hitherto adopted, for example, a method by using a larger reflux condenser so as to increase the heat-removing capability, or a method in which cooling water to be passed through the jacket for the polymerization vessel is passed through a refrigerator so as to achieve more powerful cooling.

However, the former method has the drawback that carry-over arises from foaming of the polymerization reaction mixture, leading to polymer scale deposition inside the apparatus, or the number of fish-eyes in the resulting polymer product is increased. The method also involves another drawback that the heat-removing capability is liable to be lowered, and a further drawback that the method cannot be used from the start of polymerization because application of the method at a stage of low polymerization degree leads to the formation of coarser polymer particles.

The latter method, on the other hand, is too expensive and therefore infeasible economically. Furthermore, in the case of producing a vinyl chloride-based polymer with high polymerization degree, the difference between the polymerization temperature and the temperature of cooling water should not be large; in such a case, therefore, the latter method is of no use for shortening the polymerization time.

As an alternative to the above two methods, a method has been proposed in which an aqueous suspension mixture is circulated through a cooler arranged outside of a polymerization vessel (See Japanese Preexamination Patent Publication (KOKAI) Nos. 54-24991, 56-47410, and 58-32606, and Japanese Patent Publication (KOKOKU) No. 64-11642). This method is extremely efficient in that the heat transfer surface area of the cooler coming into contact with the aqueous suspension mixture can be enlarged.

In a polymerization apparatus using the external-circulation cooling system as described above, the aqueous suspension mixture (polymerization reaction mixture) circulated is returned into the polymerization vessel through a nozzle arranged in a gas-phase zone of the polymerization vessel. The returning of the aqueous suspension mixture is accompanied by spattering of the mixture, adhesion of polymer slurry or the like. Therefore, this approach has the drawback of increased deposition of polymer scale on the inside wall of the polymerization vessel, in the area ranging from the gas-phase zone to the gas-liquid interface portion. The increased scale deposition imposes a serious problem on practical polymerizing operation.

SUMMARY OF THE INVENTION

It is accordingly an object of the present invention to provide an apparatus by which a vinyl chloride-based polymer of high quality can be produced with high productivity while effectively preventing the deposition of polymer scale on the inside wall of a polymerization vessel in the area ranging from a gas-phase zone to a gas-liquid interface portion.

According to the present invention, there is provided an apparatus for producing a vinyl chloride-based polymer which comprises a polymerization vessel for carrying out suspension polymerization of a monomeric material containing at least vinyl chloride dispersed in an aqueous suspension, and a circulating passage extended from said polymerization vessel and through a heat exchanger back to said polymerization vessel for circulating a polymerization reaction mixture, wherein the polymerization reaction mixture returning from said circulating passage into said polymerization vessel is sprayed inside the polymerization vessel so that the inside wall portion of said polymerization vessel in a gas-phase zone is entirely wetted with the polymerization reaction mixture.

According to the present invention, deposition of polymer scale on the inside wall surface of the polymerization vessel can be totally prevented. Therefore, troubles arising from polymer scale formation and labor needed to remove such polymer scale are obviated. Besides, a vinyl chloride-based polymer of high quality can be produced efficiently, without need to use a refrigerator or other heat-removing means. The polymerization apparatus according to the present invention is especially effective when applied to a large-type polymerization vessel.

DETAILED DESCRIPTION OF THE INVENTION

According to the present invention, the inside wall of a polymerization vessel in an area ranging from a gas-phase zone to a gas-liquid interface portion is constantly kept wetted with a polymerization reaction mixture (aqueous suspension) returned into the polymerization vessel. Therefore, the problems of stagnation of the polymerization reaction mixture on the inside wall and deposition of polymer scale on the wall can be obviated effectively. As a result, deposition of polymer scale on the inside wall of the polymerization vessel in the area ranging from the gas-phase zone to the gas-liquid interface portion can be prevented effectively.

The present invention will now be described in detail below, with reference to the embodiments illustrated in the attached drawings.

Figure 1:
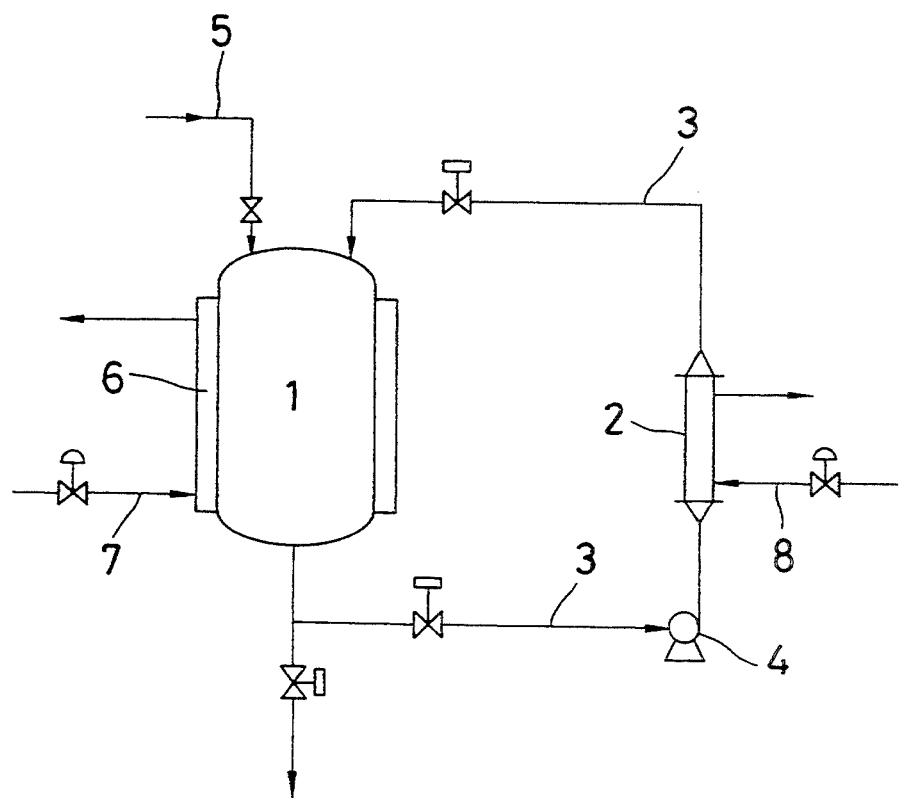
FIG. 1 illustrates the total construction of a polymerization apparatus according to the present invention.

FIG. 1 schematically illustrates the total construction of an apparatus according to the present invention. In the figure, there are shown a polymerization vessel 1, a heat exchanger 2 for heating or cooling a polymerization reaction mixture, and a circulating passage comprising a piping 3 extended from a bottom portion of the polymerization vessel 1 and through the heat exchanger 2 back to an upper portion of the polymerization vessel 1. Also shown in the figure is a circulating pump 4 disposed in the circulating piping 3 between the polymerization vessel 1 and the heat exchanger 2.

The polymerization vessel 1 is connected at an upper portion thereof with a piping 5 for feeding raw material, and is equipped with a jacket 6. Both the jacket 6 and the heat exchanger 2 are supplied with a heating or cooling medium via a piping 7 and a piping 8, respectively.

In the apparatus according to the present invention, the aqueous suspension containing a monomeric material, an aqueous medium, a dispersant, an oil-soluble polymerization initiator and the like is drawn out from the bottom portion of the polymerization vessel 1 under the action of the circulating pump 4. The aqueous suspension thus drawn out is fed through the circulating piping 3 to the heat exchanger 2, where the suspension is cooled or heated, before being conveyed again through the piping 3 and back into the gas-phase zone in the polymerization vessel 1.

Figure 2:
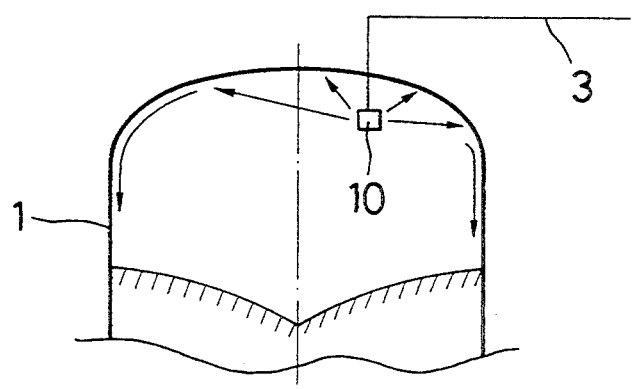
FIG. 2 illustrates the construction of a return-side end portion of a circulating piping in the polymerization apparatus of FIG. 1.

In the apparatus of the present invention, as has been described above, it is important that the inside wall of the polymerization vessel 1 in the area ranging from the gas-phase zone to the gas-liquid interface portion is constantly kept wetted with the polymerization reaction mixture (aqueous suspension) returned into the gas-phase zone in the polymerization vessel 1. For this purpose, a spray nozzle 10 is provided at a return-side end portion of the circulating piping 3, as shown in FIG. 2, and the polymerization reaction mixture being returned is sprayed toward the inside wall of the polymerization vessel 1. For wetting evenly the inside wall surface of the polymerization vessel 1, it is preferable to set the flow rate of the polymerization reaction mixture to 5 m$^3$/hr/m$^2$ or above. Besides, where water or the like is additionally mixed into the reaction mixture during polymerization, it is preferable to feed the additional water or the like through the spray nozzle 10. Naturally, the number of such spray nozzle(s) is not limited to one; for instance, a plurality of spray nozzles 10 can be provided by arranging branch pipes at the return-side end portion of the circulating piping 3.

As the polymerization vessel 1 in the polymerization apparatus according to the present invention, conventionally known types of polymerization vessels equipped with agitator, reflux condenser, baffle or jacket, and the like may be used. As the agitator, those which comprise agitating blades of paddle, Pfaudler, Brumagin, propeller, turbine or the like types may be used, either singly or, if necessary, in combination with a baffle in the form of flat plate, cylinder, hairpin coil or the like.

As the heat exchanger 2, heat exchangers of shell-and-tube, coil or spiral type or trombone coolers and the like which are in general use can be used. As a heating or cooling medium in the heat exchanger, may be used steam, cooling water, brine or the like. Besides, the circulating piping 3 itself may be constructed as a double-wall tube and cooling water or brine may be passed through the gap between the inner and outer walls, to thereby enhance the efficiency of heat removal.

As the circulating pump 4, particularly preferred are low-shear type pumps, which include, for example, screw pumps, Hydrostal pumps and the like.

In the apparatus according to the present invention, those parts which are contacted by the reaction mixture, such as the heat exchanger 2, circulating piping 3, circulating pump 4 and, further, valves and the like are preferably formed of stainless steel such as 18Cr-8Ni austenitic, 13Cr ferritic, martensitic, 18Cr ferritic, high-chromium ferritic, and two-phase austenitic-ferritic stainless steels, from the viewpoints of heat transfer and corrosion resistance. Besides, a conventionally known polymer scale preventive agent may be applied to these parts, or may be added to the aqueous suspension mixture.

For preventing deposition of polymer scale, it is preferable that the heat exchanger 2 and the circulating piping 3 are designed and arranged in such a fashion as to prevent the aqueous suspension from stagnating therein. It is particularly suitable to control the linear flow velocity of the aqueous suspension to a value of 0.7 m/sec or above. If the linear velocity is less than 0.7 m/sec, polymer scale deposition is increased.

As the vinyl chloride-based monomeric material to be subjected to polymerization in the polymerization apparatus of the present invention, not only vinyl chloride monomer but also mixtures of vinyl chloride (as a main constituent) and other vinyl monomer or monomers copolymerizable therewith (vinyl chloride content: 50% by weight or above) may be used. The comonomers which are copolymerizable with vinyl chloride include, for example, α-olefins such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like; acrylic acid or esters thereof such as acrylic acid, methyl acrylate, ethyl acrylate and the like; methacrylic acid or esters thereof such as methacrylic acid, methyl methacrylate and the like; maleic acid or esters thereof; vinyl esters such as vinyl acetate, vinyl propionate and the like; vinyl ethers such as lauryl vinyl ether, isobutyl vinyl ether and the like; maleic acid anhydride; acrylonitrile; styrene; vinylidene chloride and the like. These may be used either singly or in combination of two or more.

In carrying out the polymerization, the other polymerization conditions than the above, for example, the method of feeding the aqueous medium, vinyl chloride-based monomeric material, polymerization initiator, dispersant and the like into the polymerization vessel and the proportions of these charges may be essentially the same as in the prior art. To the polymerization system, if necessary, polymerization regulator, chain transfer agent, pH adjustor, gelation-improving agent, antistatic agent, cross-linking agent, stabilizer, filler, antioxidant, buffering agent, scale preventive agent and the like which are conventionally used suitably for polymerization of vinyl chloride-based monomeric mixtures can be added as desired.

EXAMPLES

Example 1

A 2.1-m$^3$ stainless-steel polymerization vessel equipped with jacket, a shell-and-tube type heat exchanger having a heat transfer surface area of 5.0 m$^2$, and a Hydrostal pump with an inverter-type flow rate controller and a pumping capability of 15 m$^3$/hr × 12m as a circulating pump were connected to each other through pipings, valves and the like, as shown in FIG. 1. As for returning of polymer slurry, a spray nozzle was provided at a trailing end of a return piping, as shown in FIG. 2, so that the inside wall of the polymerization vessel was constantly maintained in a wetted condition.

The polymerization vessel was charged with 840 kg of deionized water, 240 g of a partially saponified polyvinyl alcohol, and 160 g of cellulose ether, in the form of aqueous solution. After degassing the polymerization vessel to a pressure of 50 mmHg, 670 kg of vinyl chloride monomer was placed into the polymerization vessel. Further, while agitating the contents of the polymerization vessel, 2010 g of di-2-ethylhexyl peroxydicarbonate was pumped into the polymerization vessel. Thereafter, circulation of the reaction mixture to the exterior of the polymerization vessel was started, and, simultaneously, hot water was caused to flow through the polymerization vessel jacket and the heat exchanger, thereby heating. After reaction was started, cooling water was passed through the jacket to control the temperature inside the polymerization vessel, and cooling water of 30° C. was supplied to the heat exchanger at a rate of 10 m$^3$/hr. Polymerization was continued, with the internal temperature of the polymerization vessel maintained at 55° C. When the pressure inside the polymerization vessel was lowered to 6.5 kg/cm$^2$G, the unreacted monomer was recovered, and the polymerizate was taken out of the polymerization vessel as a slurry, which was then dehydrated and dried. The vinyl chloride polymer thus obtained was subjected to measurements to determine bulk specific gravity, particle size distribution, plasticizer absorption and fish-eyes, according to the methods described below. The results are set forth in Table 1.

Besides, the circulation line composed of the pipings, pump, heat exchanger and the like was examined for polymer scale deposition. These parts were all found to be free of scale deposition, and had metallic luster.

Bulk specific gravity:
 Measured according to JIS K 6721.

Particle size distribution:
 Using 60-, 80-, 100-, 150- and 200-mesh sieves according to JIS Z 8801, the polymer particles were sifted, and the amount of polymer particles (% by weight) having passed through each sieve was measured.

Plasticizer absorption:
 Glass fibers were packed in the bottom of an aluminum alloy vessel 25 mm in inside diameter and 85 mm in depth, and 10 g of the sample resin was placed into the vessel. Then, 15 cc of dioctyl phthalate (hereinafter referred to as "DOP") was added, and left to stand for 30 minutes so that the DOP permeated the resin sufficiently. Excess portion of the DOP was centrifugally removed-under an acceleration of 1500 G, and the amount of DOP absorbed in the resin was determined in parts by weight per 100 parts by weight of the resin.

Fish-eye:
 Twenty-five (25) g of a mixture prepared by mixing 100 parts by weight of the vinyl chloride polymer, 50 parts by weight of dioctyl phthalate, 0.5 part by weight of tribasic lead sulfate, 1.5 parts by weight of lead stearate, 0.1 part by weight of titanium oxide, and 0.05 part by weight of carbon black was kneaded by 6-inch kneading rolls at 140° C. for 5 minutes, and formed into a sheet 10 mm in width and 0.2 mm in thickness. For the sheet thus obtained, the number of transparent particles per 100 cm$^2$ area was counted. The count thus obtained was used as the number of fish-eyes.

COMPARITIVE EXAMPLE 1

Figure 3:
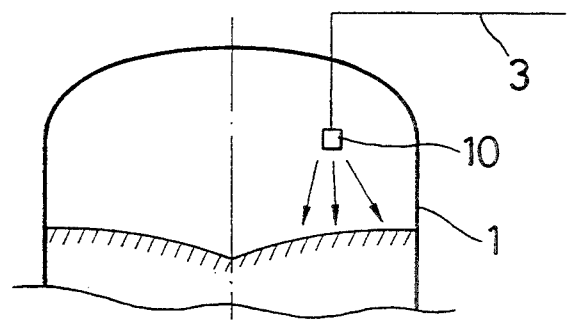
FIG. 3 illustrates the construction of a return-side end portion of a circulating piping in a polymerization apparatus used in Comparative Example.

Polymerization was carried out in the same manner as in Example 1 except that the return section of the circulating line was arranged as shown in FIG. 3 and the polymerization reaction mixture being returned into the polymerization vessel was sprayed toward the liquid surface in the polymerization vessel, instead of toward the inside wall of the polymerization vessel. The polymer thus obtained was subjected to the same measurements as in Example 1. The results are given in Table 1.

TABLE 1

| Quality of Polymer: | Example 1 | Comparative Example 1 |
|---|---|---|
| Bulk specific gravity | 0.531 | 0.525 |
| Particle size distribution (pass (wt.%)) | | |
| 60 mesh | 100 | 100 |
| 80 mesh | 72.1 | 60.8 |
| 100 mesh | 43.6 | 39.6 |
| 150 mesh | 15.6 | 25.1 |
| 200 mesh | 0.2 | 0.8 |
| Plasticizer absorption | 23.5 | 22.7 |
| Fish-eye | 8 | 20 |
| Deposition of polymer scale on inside surface of polymerization vessel | Only a little scale deposition in gas-liquid interface area. Not any scale deposition in other areas. | Thick scale deposition in gas-liquid interface area. Film-form scale deposition in gas-phase area. |

We claim:

1. A process for producing a vinyl chloride-based polymer which comprises the step of subjecting an aqueous suspension of a monomeric material containing at least vinyl chloride to suspension polymerization in a polymerizer, while circulating said aqueous suspension from the interior to the exterior and back to the interior of said polymerizer by a circulating passage connected to said polymerizer,
   wherein the said aqueous suspension comprising a polymer slurry circulated through said circulating passage is returned during its polymerization into said polymerizer so as to wet entirely the inside wall portion of said polymerizer in a gas-phase zone.

2. The method according to claim 1, wherein the flow rate of the aqueous suspension in said circulating passage is 5m$^3$/hr/m$^2$ or above.

* * * * *